US007971529B2

(12) United States Patent
Chagnon et al.

(10) Patent No.: US 7,971,529 B2
(45) Date of Patent: Jul. 5, 2011

(54) ASSEMBLY FOR ROTARY PRESS

(75) Inventors: Franck Chagnon, Saint Leu (FR); Philippe Robin, Cires les Mello (FR)

(73) Assignee: Goss International Montataire SA, Montataire (FR)

( * ) Notice: Subject to any disclaimer, the term of this patent is extended or adjusted under 35 U.S.C. 154(b) by 345 days.

(21) Appl. No.: 11/522,199

(22) Filed: Sep. 15, 2006

(65) Prior Publication Data

US 2007/0062390 A1    Mar. 22, 2007

(30) Foreign Application Priority Data

Sep. 15, 2005 (FR) ..................................... 05 09448

(51) Int. Cl.

| | |
|---|---|
| ***B41F 27/14*** | (2006.01) |
| ***B41F 27/00*** | (2006.01) |
| ***B25F 5/02*** | (2006.01) |
| ***F16C 13/00*** | (2006.01) |

(52) U.S. Cl. ..................... 101/382.1; 101/378; 101/216; 492/49; 492/45

(58) Field of Classification Search .................. 101/216, 101/382.1, 383, 378, DIG. 36; 492/27, 38, 492/45, 49

See application file for complete search history.

(56) References Cited

U.S. PATENT DOCUMENTS

| | | | | |
|---|---|---|---|---|
| 3,076,633 | A | 2/1963 | Bridle | 253/77 |
| 4,864,926 | A | 9/1989 | Saueressig | 101/153 |
| 6,443,064 | B1 * | 9/2002 | McEachern | 101/382.1 |

FOREIGN PATENT DOCUMENTS

| | | |
|---|---|---|
| CH | 345023 | 4/1960 |
| DE | 199 03 220 | 8/2000 |
| EP | 0181 726 | 5/1986 |
| JP | 2003311927 | 11/2003 |
| WO | WO 2005/014286 | 2/2005 |

* cited by examiner

*Primary Examiner* — Daniel J Colilla
*Assistant Examiner* — Leo T Hinze
(74) *Attorney, Agent, or Firm* — Davidson, Davidson & Kappel, LLC

(57) ABSTRACT

An assembly for a rotary press is provided including a hub which is suitable for being rotatably mounted about a center axis in a rotary press, a format adaptation sleeve and means for fixing the adaptation sleeve to the hub. The hub and the adaptation sleeve each include a stop surface. The stop surfaces have a frustoconical shape about the center axis, and the fixing means comprise a radial stop element which is suitable for being interposed between the hub and the adaptation sleeve.

16 Claims, 5 Drawing Sheets

ASSEMBLY FOR ROTARY PRESS

The present invention relates to an assembly for a rotary press, of the type including a hub which is suitable for being rotatably mounted about a center axis in a rotary press and which has an outer surface, a format adaptation sleeve which is intended to be mounted on the hub and which includes an inner surface which is suitable for pressing on the outer surface of the hub, means for fixing the adaptation sleeve to the hub.

BACKGROUND OF THE INVENTION

In a rotary press, the circumferential length of the printing plate is a parameter which limits the format or the printing length of the product to be printed. In order to increase the flexibility of the press, it is necessary to allow a variation of the printing length or a variation of format.

In order to modify the circumferential length of a cylinder having a fixed radius in a press, open adaptation sleeves having different thicknesses can be mounted on a hub. A sleeve of this type is, for example, disclosed in the application WO2005/014286 by the same applicant.

The production of a tension mechanism which is intended to tension such an open sleeve around a cylindrical hub is complex owing to the need to prevent the top and bottom edges of the sleeve from being raised from the hub under the effect of the tensile force.

Furthermore, it is known to expand a closed adaptation sleeve by means of a cushion of air in order to be able to mount it on the hub of the press. However, the expansion of a closed sleeve requires very great pressure or involves the use of a sleeve which is both resilient and incompressible, material properties which are generally incompatible.

SUMMARY OF THE INVENTION

For this reason, an object of the invention may be to overcome the disadvantages mentioned and provide an assembly which includes an adaptation sleeve and a hub, the sleeve being easy to mount on the hub.

To this end, the invention provides an assembly for a rotary press, characterised in that the hub and the adaptation sleeve each include a stop surface which limits the axial displacement of the adaptation sleeve on the hub, in that the stop surfaces have a frustoconical shape about the center axis, and in that the fixing means comprise a radial stop element which is suitable for being interposed between the hub and the adaptation sleeve.

According to specific embodiments of the invention, the assembly may include one or more of the following features:

the adaptation sleeve and the hub each include a supporting surface which is suitable for coming into contact with the stop element in order to fix the adaptation sleeve to the hub, the first of the supporting surfaces has a generating line which is parallel with the center axis and the second of the supporting surfaces has a generating line which is inclined relative to the center axis;

the first supporting surface is cylindrical having a circular cross-section about the center axis and the second supporting surface is frustoconical;

the first supporting surface is arranged on the adaptation sleeve and the second supporting surface is arranged on the hub;

the stop element is a resiliently deformable hoop ring;

the hoop ring includes a cylindrical outer surface and a frustoconical inner surface;

the assembly includes means for removing the stop element;

the removal means include a threaded portion which is arranged in the stop element and a removal screw;

the assembly includes indexing means which are suitable for fixing the adaptation sleeve to the hub in a mutually defined relative circumferential position;

the adaptation sleeve carries a device for fixing a plate to the adaptation sleeve; and the assembly includes a supplementary adaptation sleeve which is suitable for being fixed to the hub, the two adaptation sleeves having outer surfaces whose circumferences are different from each other.

BRIEF DESCRIPTION OF THE DRAWINGS

The invention will be better understood from a reading of the following description, given purely by way of example and with reference to the appended drawings, in which.

DESCRIPTION OF PREFERRED EMBODIMENTS

Figure 1:
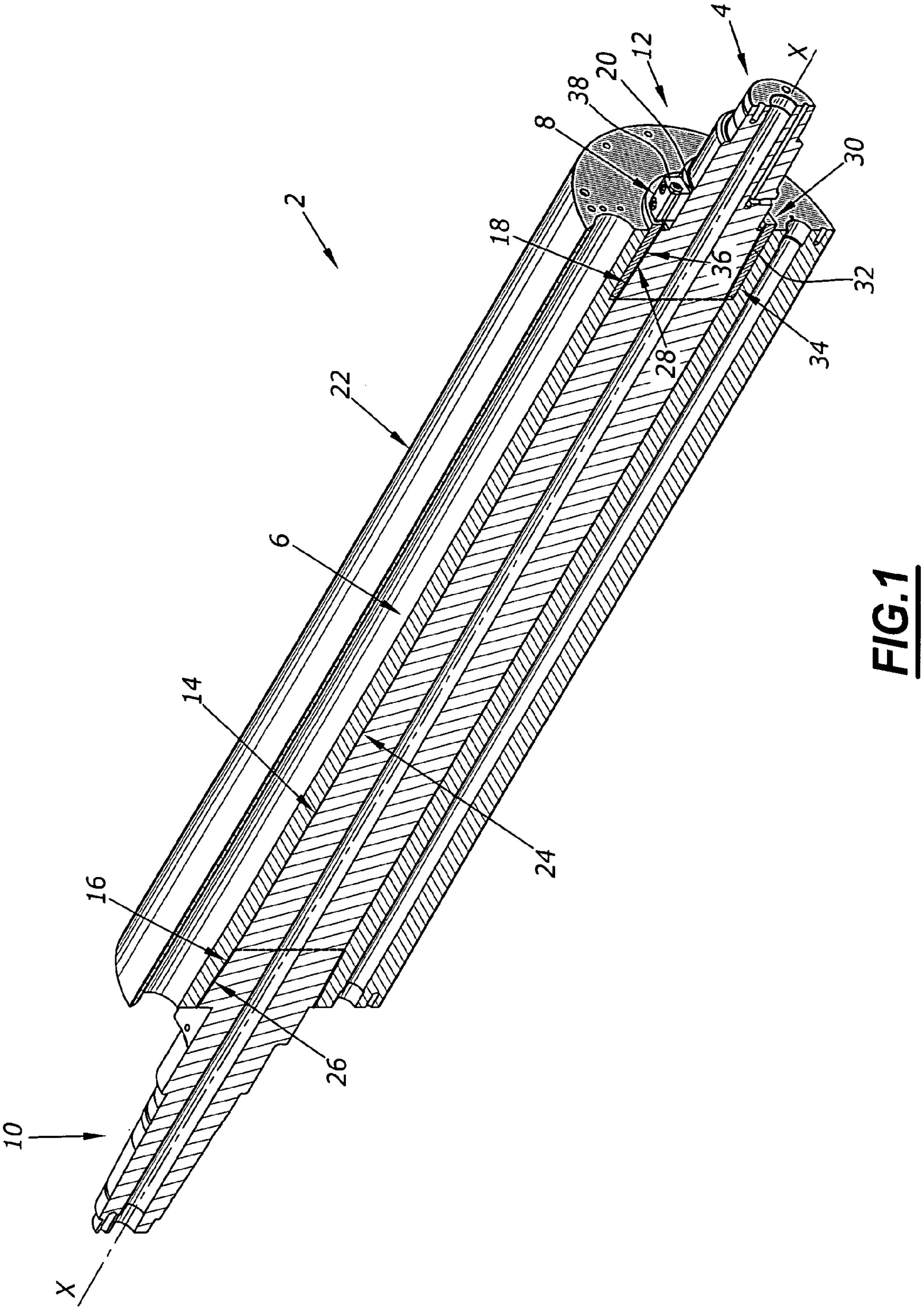
FIG. 1 is a perspective schematic view of an axial section of an assembly of an adaptation sleeve and a hub according to the invention.

FIG. 1 illustrates an assembly for a rotary press, generally designated 2.

The assembly 2 comprises a hub 4 and a format adaptation sleeve 6 which is closed over the periphery thereof. The assembly 2 further includes means 8 for fixing the adaptation sleeve 6 to the hub 4.

The hub 4 and the adaptation sleeve 6 extend along a common center axis X-X. The hub 4 and the adaptation sleeve 6 are suitable for being rotatably mounted about this center axis X-X in a rotary press which is not illustrated. To this end, the hub 4 comprises a control end 10 which is connected to driving means, such as an electric motor, and an operating end 12.

The hub 4 includes a central outer surface 14 which has a cylindrical shape having a circular cross-section which is centered on the center axis X-X. It further includes a stop surface 16 which is connected to the central outer surface 14 at the control end side. The stop surface 16 has a frustoconical shape having an axis X-X which widens towards the control end 10. The hub 4 further includes a supporting surface 18 which is connected to the central cylindrical outer surface 14, at the operating end 12. This supporting surface 18 has a frustoconical shape having an axis X-X which narrows towards the operating end 12.

It should be noted that the stop surface 16 and the supporting surface 18 are each connected in a stepless manner to the central cylindrical outer surface 14. That is to say, the diameters of the stop surface 16 and supporting surface 18, at the end thereof directed towards the central outer surface 14, are identical to the diameter of the surface 14.

Figure 2:
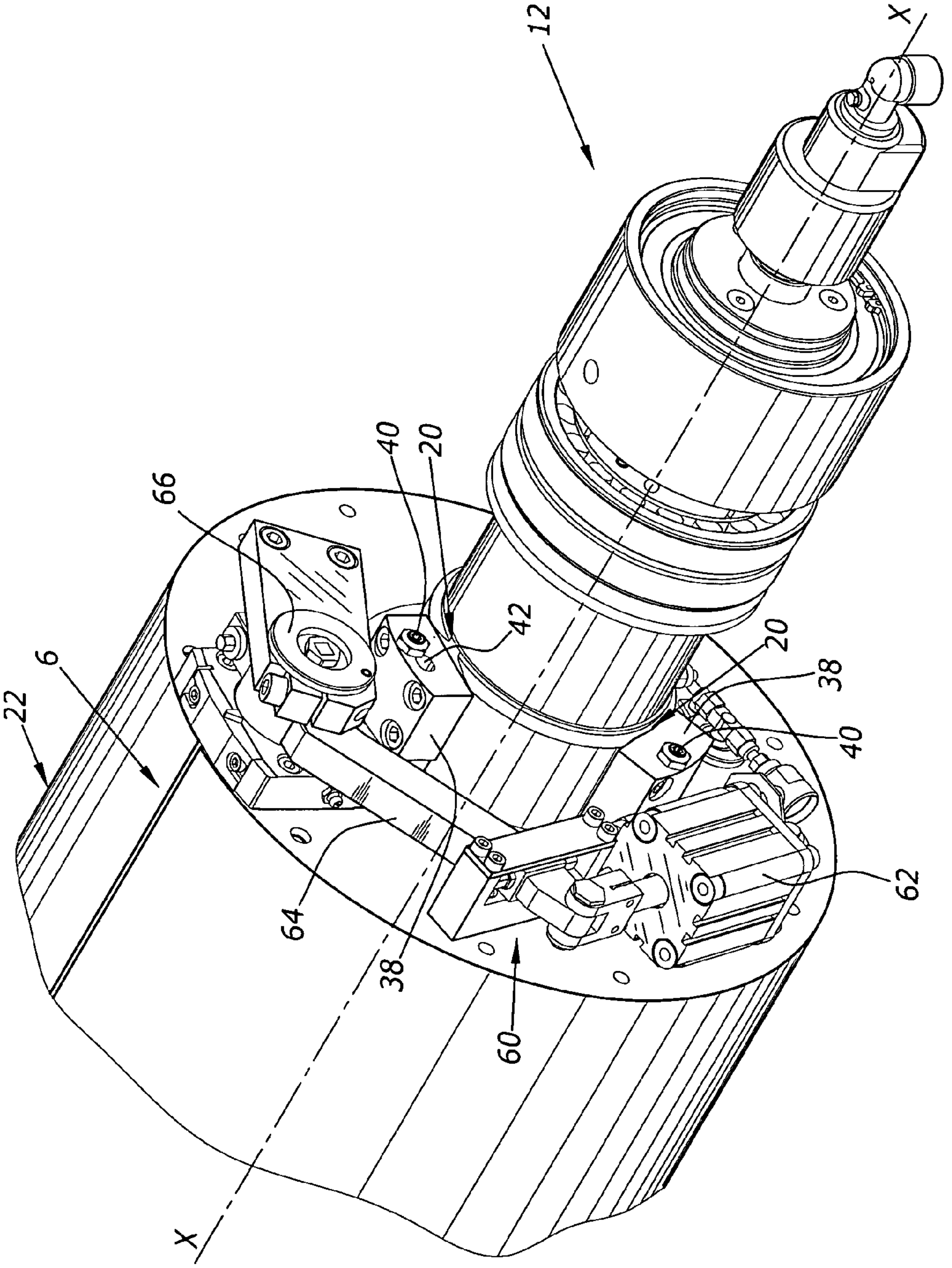
FIG. 2 is an enlarged perspective view of an end of the assembly of FIG. 1.

As illustrated in FIG. 2, the hub 4 further includes three fixing surfaces 20. These fixing surfaces 20 are planar and extend in a manner adjacent to the support surface 18. The three fixing surfaces 20 are distributed in a regular manner about the center axis X-X.

Figure 3:
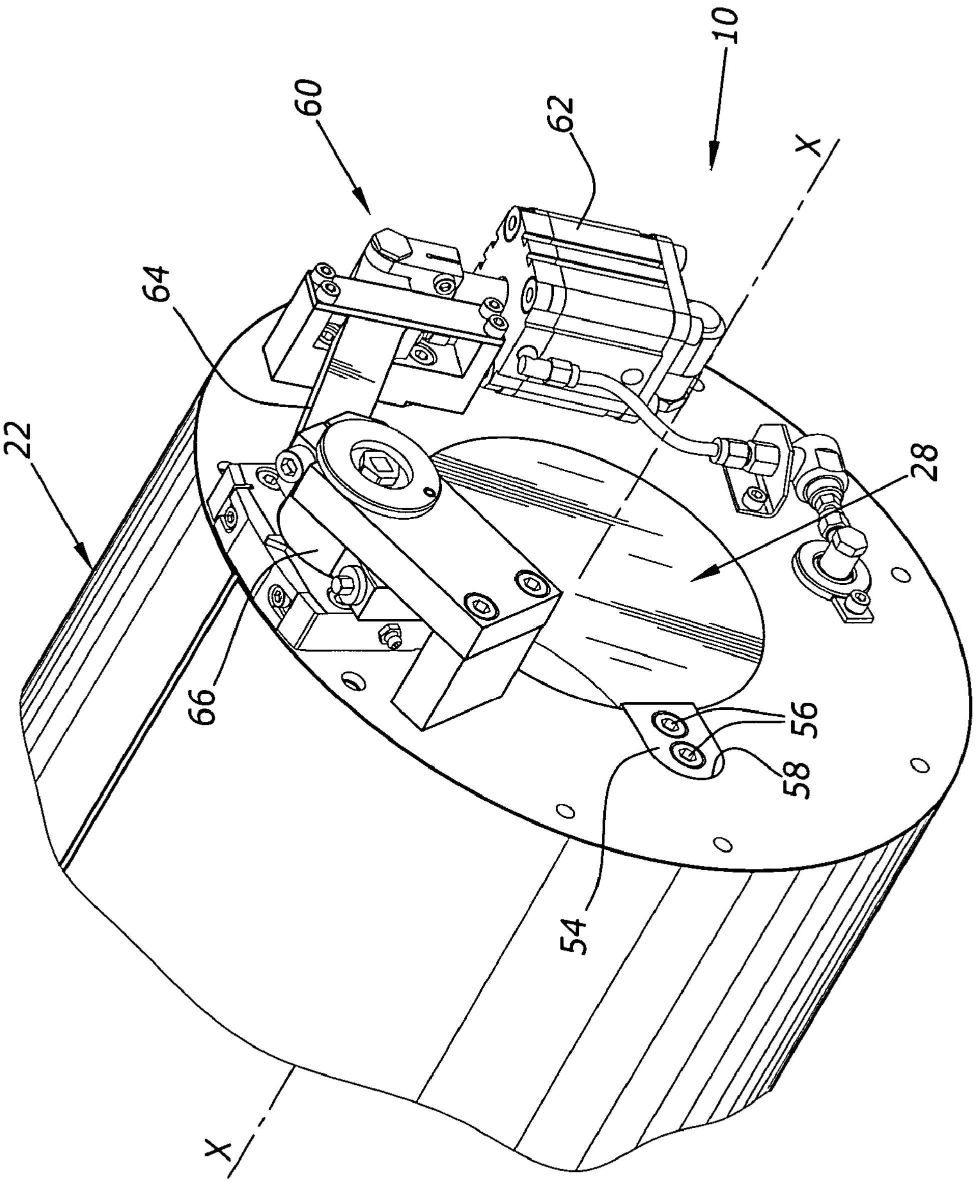
FIG. 3 is a perspective view of the other end of the adaptation sleeve without the hub.

As can be seen in FIGS. 1 and 3, the adaptation sleeve 6 includes a cylindrical outer surface 22 which receives in the mounted state a printing plate or a resilient blanket which are not illustrated. The adaptation sleeve 6 further includes a central cylindrical inner surface 24 which has a circular cross-section having an axis X-X, which has the same diameter as the outer surface 14 in addition to the clearance which is required in order to be able to fit the adaptation sleeve 6 onto the outer surface 14 of the hub 4 without expanding it. The central inner surface 24 has the same axial length as the central outer surface 14. The inner surface 24 is thus suitable for pressing on the outer surface 14 of the hub 4.

The adaptation sleeve 6 is further provided with a stop surface 26 which is connected to the inner surface 24 at the control end 10 and which has a frustoconical shape having an axis X-X which widens towards the control end 10. The two stop surfaces 16, 26 limit the axial displacement of the adaptation sleeve 6 on the hub 4 in the direction orientated towards the control end 10. The generating lines of the two stop surfaces 16 and 26 are, for example, inclined relative to the axis X-X by a value of from 1° to 3°. The stop surfaces 16 and 26 are complementary.

The low level of conicity of these stop surfaces 16, 26 leads to the adaptation sleeve 6 being rotatably fixed to the hub 4 by the stop surface 26 being pressed on the stop surface 16.

The adaptation sleeve 6 further includes an inner supporting surface 28. This supporting surface 28 is cylindrical having a circular cross-section about the center axis X-X and extends opposite the supporting surface 18 of the hub 4 leaving an annular gap 30 which is open towards the operating end 12. The inner supporting surface 28 has a diameter which is greater than the diameter of the cylindrical central inner surface 24 so that these two surfaces 24, 28 are separated by a stepped portion.

The means 8 for fixing the adaptation sleeve 6 to the hub 4 comprise a radial stop element which, in the present example, is constituted by a hoop ring 32 which is closed and resiliently deformable. The hoop ring 32 includes a cylindrical outer surface 34 which has substantially the same diameter as the inner supporting surface 28, and a conical inner surface 36 which has a frustoconical shape which complements the shape of the supporting surface 18 of the hub 4.

The fixing means 8 further include three fixing blocks 38, each of which is fixed to one of the fixing surfaces 20. This fixing block 38 includes a threaded portion which extends parallel with the center axis X-X, as illustrated in FIG. 2. A thrust screw 40 is screwed into this threaded portion and is suitable for axially pushing the stop element 32 towards the control end 10.

Furthermore, the fixing block 36 includes a through-hole 42 which extends parallel with the axis X-X and which faces a threaded portion which is not illustrated and which is arranged in the stop element 32.

This hole 42, the threaded portion, and a removal screw which is not illustrated constitute means for removing the stop element 32 from the gap 30.

Figure 4:
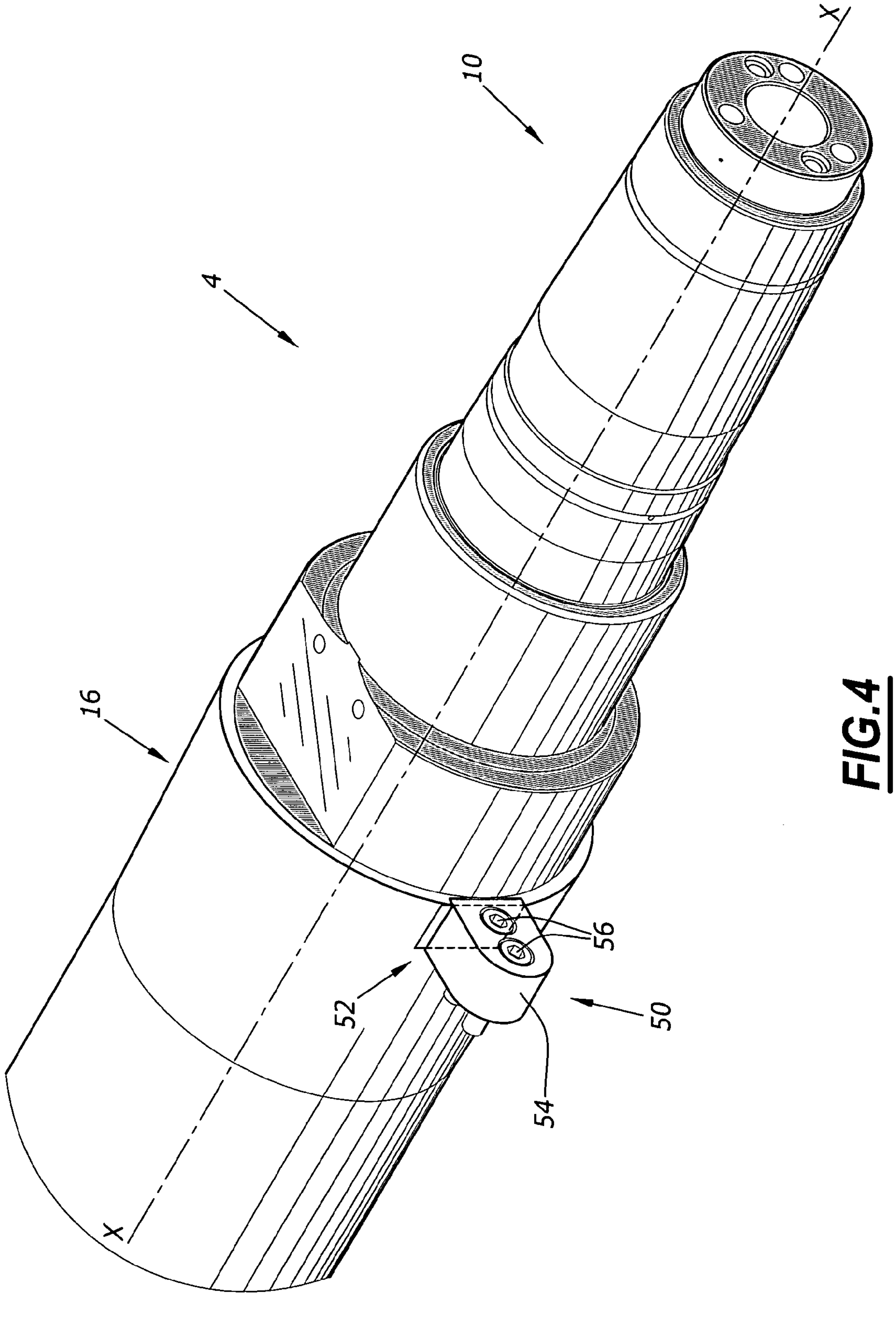
FIG. 4 is a perspective view of an end of the hub corresponding to the end illustrated in FIG. 3.

The assembly 2 further includes indexing means 50 which are suitable for fixing the adaptation sleeve 6 to the hub 4 in a defined circumferential position. These indexing means 50 comprise on the one hand a notch 52 which is arranged in the hub 4, in this instance, arranged in the supporting surface 16 (see FIG. 4) and an indexing key 54 which is fixed via two screws 56 in a corresponding recess 58 of the adaptation sleeve 6. The indexing key 54 and the notch 52 have complementary shapes.

As can be seen in particular in FIGS. 2 and 3, the adaptation sleeve 6 carries a device 60 for fixing a plate to the adaptation sleeve 6. This fixing device 60 includes a jack 62 which is connected by means of a lever 64 to a device 66 for clamping a printing plate which is not illustrated.

The adaptation sleeve 6 is mounted on the hub 4 in the following manner.

Firstly, the adaptation sleeve 6 is axially aligned with the hub 4. The adaptation sleeve 6 is then fitted onto the hub 4 by displacing the adaptation sleeve 6 towards the control end 10 of the hub 4 until the two stop surfaces 16, 26 come into contact.

The recess 58 is then circumferentially aligned with the notch 52 and the indexing key 54 is screwed into the recess 58.

The stop element 32 is then axially inserted into the annular gap 30, after which the fixing blocks 38 are screwed to the fixing surfaces 20. Finally, the stop element 32 is pushed axially towards the control end 10 by means of screws 40 which are screwed into the fixing block 38.

The stop element 32 thus expands radially under the effect of the inner supporting surface 18.

Figure 5:
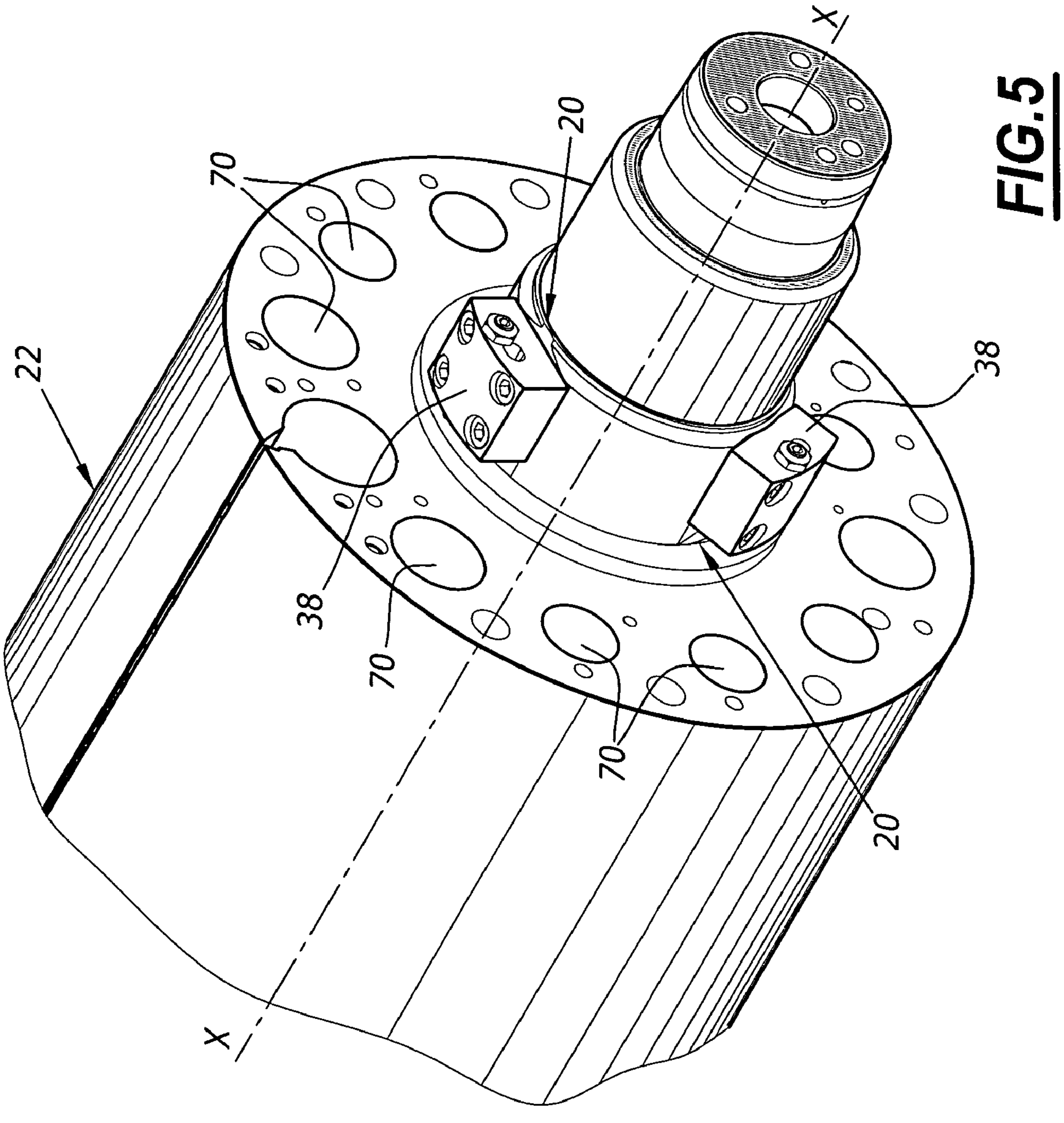
FIG. 5 is a perspective view of one end of a variant of an assembly according to the invention.

FIG. 5 illustrates a variant of an adaptation sleeve 6 which includes, as the only difference compared with the adaptation sleeve of FIGS. 1 to 4, weight reduction cells 70.

The conical stop surfaces 16, 26 and the supporting surfaces 18, 28 are easy to produce, which allows the assembly 2 to be produced at low cost.

The fact that the plate fixing device 60 is arranged on the adaptation sleeve 6 allows the adaptation sleeve 6 to be rapidly replaced with another adaptation sleeve 6 which is also provided with a plate fixing device, without the plate fixing device 60 having to be disassembled.

Furthermore, the assembly 2 according to the invention includes a supplementary adaptation sleeve 6 which is not illustrated and which is suitable for being fixed to the hub 4, the two adaptation sleeves 6 having outer surfaces whose circumferences are different from each other.

The invention claimed is:

1. A rotary press assembly comprising:

a hub rotatably mounted about a center axis in a rotary press and having an outer radial surface, the outer radial surface of the hub including:

a hub stop surface at a first end of the hub, the hub stop surface having a frustoconical shape about the center axis;

a hub supporting surface at a second end of the hub; and a central hub surface between the hub stop surface and the hub supporting surface, the central hub surface being cylindrical with a circular cross section;

a format adaptation sleeve mountable on the hub and having an inner radial surface, the inner radial surface of adaptation sleeve including:

a sleeve stop surface adjacent to a first end of the central sleeve surface, the sleeve stop surface having a frustoconical shape about the center axis;

a sleeve supporting surface adjacent to a second end of the central sleeve surface, the sleeve supporting surface and the hub supporting surface defining an annular gap; and a central sleeve surface pressing on the outer central hub surface of the hub, the central sleeve surface being between between the sleeve stop surface and the sleeve supporting surface, the central sleeve surface being cylindrical with a circular cross section; and a deformable stop interposed between the sleeve supporting surface and the hub supporting surface in the annular gap for aiding in fixing the adaptation sleeve to the hub, the hub and sleeve supporting surfaces contacting the stop and fixing the adaptation sleeve to the hub, the adaptation sleeve being fittable onto the hub before insertion of the stop into the annular gap, the stop being axially inserted into the annular gap.

2. The assembly as recited in claim 1 wherein the sleeve supporting surface has a generating line parallel with the center axis and the hub supporting surface has a generating line inclined relative to the center axis.

3. The assembly as recited in claim 2 wherein the sleeve supporting surface is cylindrical having a circular cross-section about the center axis and the hub supporting surface is frustoconical.

4. The assembly as recited in claim 2 wherein the stop is a resiliently deformable hoop ring.

5. The assembly as recited in claim 4 wherein the hoop ring includes a cylindrical outer surface and a frustoconical inner surface.

6. The assembly as recited in claim 1 wherein the assembly includes means for removing the stop.

7. The assembly as recited in claim 6 wherein the removal means include a threaded portion arranged in the stop and a removal screw.

8. The assembly as recited in claim 1 further comprising indexing means fixing the adaptation sleeve to the hub in a mutually defined relative circumferential position.

9. The assembly as recited in claim 1 wherein the adaptation sleeve carries a device for fixing a plate to the adaptation sleeve.

10. The assembly as recited in claim 1 further comprising a further adaptation sleeve fixable to the hub, the further adaptation sleeve having an outer surface with a different circumference with respect to the adaptation sleeve.

11. The assembly was recited in claim 1 wherein the radial stop includes at least one fixing block fixed to the hub, each fixing block including a threaded portion and a thrust screw, the thrust screw in the threaded portion being suitable for axially pushing the radial stop towards a control end.

12. The assembly as recited in claim 1 wherein the central sleeve surface of the adaptation sleeve, the corresponding sleeve stop surface and the sleeve supporting surface are coaxial with the center axis.

13. The assembly as recited in claim 1 wherein the central sleeve surface of the adaptation sleeve, the corresponding sleeve stop surface and the sleeve supporting surface form a continuous surface.

14. The assembly as recited in claim 1 wherein the central surface of the hub sleeve, the corresponding hub stop surface and the hub supporting surface are coaxial with the center axis.

15. The assembly as recited in claim 1 wherein the central surface of the hub sleeve, the corresponding hub stop surface and the hub supporting surface form a continuous surface.

16. The assembly as recited in claim 1 wherein the stop is radially compressed between the hub supporting surface and sleeve supporting surface.

* * * * *

UNITED STATES PATENT AND TRADEMARK OFFICE

CERTIFICATE OF CORRECTION

PATENT NO. : 7,971,529 B2
APPLICATION NO. : 11/522199
DATED : July 5, 2011
INVENTOR(S) : Franck Chagnon and Philippe Robin It is certified that error appears in the above-identified patent and that said Letters Patent is hereby corrected as shown below:

Column 1, lines 64 to 66, of the specification:

"the central sleeve surface being between between the sleeve stop surface and the sleeve supporting surface..."

should read

"the central sleeve surface being between the sleeve stop surface and the sleeve supporting surface..."

Signed and Sealed this
Twenty-seventh Day of September, 2011

David J. Kappos
*Director of the United States Patent and Trademark Office*